United States Patent [19]

Eichenauer et al.

[11] Patent Number: 5,071,921

[45] Date of Patent: Dec. 10, 1991

[54] THERMOPLASTIC BLOCK COPOLYMERS BASED ON CYCLIC CARBONATES OR ESTERS

[75] Inventors: Herbert Eichenauer, Dormagen; Christian Lindner, Cologne; Edgar Leitz, Dormagen; Karl-Heinz Ott, Leverkusen; Hans-Josef Buysch, Krefeld; Peter Mues, Duisburg; Hartwig Höcker, Eckersdorf; Helmut Keul, Karlsruhe, all of Fed. Rep. of Germany

[73] Assignee: Bayer Aktiengesellschaft, Leverkusen-Bayerwerk, Fed. Rep. of Germany

[21] Appl. No.: 426,460

[22] Filed: Oct. 20, 1989

Related U.S. Application Data

[63] Continuation of Ser. No. 213,267, Jun. 28, 1988, abandoned, which is a continuation of Ser. No. 17,856, Feb. 24, 1987, abandoned.

[30] Foreign Application Priority Data

Mar. 7, 1986 [DE] Fed. Rep. of Germany ....... 3607627

[51] Int. Cl.$^5$ .............................................. C08G 64/18
[52] U.S. Cl. .................... 525/385; 525/186; 525/333.1; 525/333.2; 525/333.3; 525/383; 525/386
[58] Field of Search ............ 525/185, 186, 383, 333.1, 525/333.2, 333.3, 385

[56] References Cited

U.S. PATENT DOCUMENTS

| | | | |
|---|---|---|---|
| 3,585,257 | 6/1971 | Mueller et al. | 260/880 |
| 3,598,799 | 8/1971 | Naylor | 260/879 |
| 3,639,519 | 2/1972 | Hsieh | 525/164 |
| 4,101,522 | 7/1978 | Sheppard | 525/26 |
| 4,360,643 | 11/1982 | Naylor | 525/386 |
| 4,760,117 | 7/1988 | Evans | 525/394 |

FOREIGN PATENT DOCUMENTS 1805864  7/1970  Fed. Rep. of Germany.

OTHER PUBLICATIONS

"Styrene-Diene-Lactone Block Copolymers", Journal of Applied Polymer Science, vol. 22, pp. 1119-1127 (1978).

"Block Polymers Obtained by Means of Anionic Polymerization ... Carbonate", Die Makromolekulare Chemie, No. 12, Dec. 1986, pp. 2833-2839.

"Block Copolymerization VI Polymerization of ... Polytetrahydrofuran", Journal of Polymer Science, vol. 11, pp. 425-434 (1973).

*Primary Examiner*—Patricia Short
*Attorney, Agent, or Firm*—Connolly and Hutz

[57] ABSTRACT

Thermoplastic block copolymers of the idealized formulae (I)

$$A-B-A;\ B-A-B\ \text{or}\ (A-B)_x \quad (I)$$

in which $x = 1$ to 40, and wherein
A is the radical of a homopolymer of styrene, vinylnaphthalene, butadiene and isoprene, and
B the radical of a homopolymer of a cyclic polycarbonate or lactone, the average molecular weight of blocks A and B being greater than 800, and a process for the preparation of these block copolymers in several reaction stages.

9 Claims, No Drawings

THERMOPLASTIC BLOCK COPOLYMERS BASED ON CYCLIC CARBONATES OR ESTERS

This application is a continuation of application Ser. No. 213,267, filed June 28, 1988, now abandoned, which is a continuation of application Ser. No. 017,856 filed Feb. 24, 1987 now abandoned.

The invention relates to polymers structured in block form with blocks of homopolymers of cyclic carbonates or esters and lo a process for the preparation of the new polymers.

Polymers with a block structure, that is to say block copolymers, can have interesting technological properties, for example—depending on their structure and chemical composition—they can be thermoplastics or thermoplastic elastomers.

To be technologically useful, however, they must meet certain requirements such as stability at higher processing temperatures, to ensure processing by conventional methods, for example by injection moulding, extrusion or calandering, at usual processing temperatures. The stability of a polymer, however, is frequently determined not only by its basic chemical structure but also by the number of chemical and structural defects, the structural points which increase the stability of the polymer, end groups, the molecular weight distribution and the chemical non uniformity. The relationship between such parameters and the physical properties of a plastic cannot be predicted by theory and must therefore be determined empirically in each individual case.

It has now been found that block copolymers based on blocks of polymers of particular cyclic monomers and blocks of polymers of particular vinyl or diene monomers have outstanding properties and that these polymers can be obtained in a sufficiently stable form if produced in a particular process.

The invention thus relates to thermoplastic block copolymers of the idealized formulae (I)

$$A—B—A;\ B—A—B\ \text{or}\ (A—B)_m \quad \text{I}$$

in which
x = 1 to 40, and in particular x = 6 to 20,
and wherein
A = the radical of a homopolymer of styrene, vinylnaphthalene, butadiene and isoprene, in particular styrene or butadiene, and
B = the radical of a homopolymer of a cyclic carbonate or lactone of the general formulae (II) to (IV)

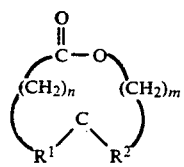

II

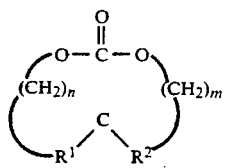

III

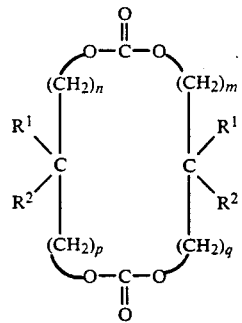

IV wherein
m, n, p and q independently of one another are 0, 1, 2, 3, 4, 5 or 6 with the proviso that n+m in formulae III is at least 1, n+m in formula II is at least 2 and n+p as well as m+q in formula IV at least 1 and $R^1$ and $R^2$ each denote H, $C_{1-6}$-alkyl, $C_{3-6}$-alkenyl or $C_{1-6}$-alk(en)yloxy-$C_{1-6}$-alkyl, in particular H, $CH_3$ and $C_2H_5$.

The average molecular weight of blocks A and B are greater than 800, preferably greater than 1000 and particularly preferably greater than 10,000.

Particularly preferred cyclic monomers (II) to (IV) are trimethylene glycol carbonate, neopentyl glycol carbonate, 1,4-butanediol carbonate, dimeric carbonates of pentanediol or hexanediol and caprolactone. Cyclic carbonates are particularly preferred. In the block copolymers according to the invention, the average molecular weight of blocks A and B can be different in size or almost the same size.

The block copolymers contain blocks A and B in amounts of 5 to 95% by weight, preferably in amounts of 5 to 20% by weight of A and 95% to 80% by weight of B and 5 to 20% by weight of B and 95 to 80% of A; that is to say in the preferred block copolymers either component A or component B predominates.

The invention also relates to a process for the preparation of the block copolymers. In this process, a monomer which forms block A is homopolymerized in an aromatic solvent or ether by means of an alkyl-alkali metal or aryl-alkali metal compound in a first stage to form a live polymeric anion; optionally the live anion of polymeric A is then reacted with an epoxide or an aldehyde in a second stage, at least 1 mol of epoxide or 1 mol of aldehyde being employed per mol of anion of polymeric A; the anion A or its form modified with the epoxide or with the aldehyde is subsequently subjected to block copolymerization with a monomer of the formulae (II) to (IV) in the temperature range from −50° C. to +10° C. in a third stage, and thereafter the resulting block polymer is recovered in a fourth stage. The process including stage 2 is preferred.

In a preferred embodiment of the process the polymerization batch is neutralized or the anionic block polymer formed is reacted with alkyl halides, carboxylic acid chlorides or carboxylic acid esters after the third stage.

Aromatic solvents in the context of the invention are benzene and toluene; an ether in the context of the invention is, in particular, tetrahydrofuran; to achieve certain molecular weights of the block copolymers, it is also possible to carry out the reaction in mixtures of aromatic hydrocarbons and ethers. Alkyl-alkali metal compounds in the context of the invention are butyllithium, in particular secondary butyl-lithium, Na-naphthalene and K-naphthalene. Epoxides in the context of the invention are preferably monoepoxides such as ethylene oxide, propylene oxide, butylene oxide and glycidyl derivatives, but in particular ethylene oxide or propylene oxide. Examples of suitable aldehydes are formaldehyde, acetaldehyde, propionaldehyde, n-butyraldehyde, isobutyraldehyde, valeraldehyde, pivalinaldehyde, benzaldehyde and in particular formaldehyde and acetaldehyde.

The polymerization reactions are all carried out at temperatures below 20° C., preferably below 10° C., independently of the temperatures in stages 1 and 2, however, stage 3 must be carried out at a temperature of $-50°$ C. to 10° C., preferably $-20°$ C. to 0° C.

After the block copolymerization the polymer formed can be neutralized or reacted with suitable compounds which can react with carbanions—to form an uncharged stable end product.

Neutralizing agents in the context of the invention are, for example, weak inorganic or organic acids or acidic salts from proton acids N—H— and C—H-acidic acids; the compounds which can react with carbanions are alkyl halides (in particular methyl chloride, methyl iodide, benzyl chloride or benzyl bromide), carboxylic acid chlorides (in particular benzoyl chloride, chloroformic acid esters, phosgene, acetyl chloride, caproyl chloride or stearoyl chloride), carboxylic acid anhydrides (in particular acetic anhydride or succinic anhydride) and carboxylic acid esters (in particular activated esters such as carboxylic acid phenyl esters, carboxylic acid nitrophenyl esters and alkyl esters of carboxylic acids, is being possible for the alkyl groups optionally to be substituted by activating groups such as nitro groups, the CN group and carboxyl groups.

These compounds are usually fed to the polymerization batch at the end of the block copolymerization, preferably in dissolved form, and it must be ensured that the components are mixed thoroughly. It is advantageous to introduce these compounds in a molar excess.

In a fourth stage, the block polymer is isolated from the polymerization batch, undesirable impurities being separated off if necessary.

This is possible by precipitation of the block copolymer from the polymer solution and subsequent purification by washing; it is more advantageous, however, to isolate the polymer by an evaporation. During such evaporation or before this evaporation, it is advisable to maintain conditions such that purification can take place at the same time or beforehand, for example by azeotropic distillation, extraction or fractional distillation.

Since the process according to the invention involves live anions, conditions under which such live anions prevail must of course be maintained, for example anhydrous conditions, The polymerization parameters and conditions of the process according to the invention are important, since, depending on the temperature (of stage 3) and the type of solvent during polymerization of the cyclic monomers, undesirable chain termination reactions may occur which degrade the quality of the block copolymers.

The block copolymers according to the invention are thermoplastic and can thus be converted into mouldings by known methods of thermoplastic processing. If the blocks A are of diene monomers, the products are elastomeric in character; if the blocks A are of vinyl monomers, the polymers are more resin-like thermoplastics.

Surprisingly, the new polymers are sufficiently stable during processing above 150° C. and show no molecular degradation. Therefore the resulting shaped articles have excellent mechanical properties which do not deteriorate even after several exposures to heat. Resinous polymers have surprisingly good mechanical impact strengths, although the blocks B are not entirely rubber-like; the toughness of the polymers thus appears to be related to the specific segment structure and type; more rubber-like polymers, on the other hand, have good properties at low temperatures and a good flexibility and plasticity, although they contain blocks B; the properties during rubber processing and the long-term properties are improved by the presence of the blocks B.

The block polymers according to the invention are preferably suitable—depending on their chemical composition—for the production of films, sealings and coatings, especially in cases where improved long-term properties are required, and they are also suitable for the preparation of resinous, thermoplastic packaging materials, in particular for foodstuff.

The polymers according to the invention can be stabilized, pigmented and given a finish which renders them antistatic, more easily processable or flame-retardant by means of customary additives and they can be filled with fillers in known manner.

EXAMPLES

1. Polystyrene block poly-ε-caprolactone 0.4 ml of sec.-buthyl-lithium (1.4M solution in cyclohexane) was added to a solution of 15 g of styrene in 450 ml of toluene at $+40°$ C. under nitrogen and the mixture was allowed to react at this temperature for four hours.

The solution of polystyryl-lithium was cooled to $-10°$ C. and treated with ethylene oxide until the solution was decolorized. 30 g of ε-caprolactone were added to the lithium alcoholate solution thus formed and the mixture was allowed to react at $-10°$ C. for four hours.

The composition of the reaction mixture was carried out with 10 ml of methanol/hydrochloric acid (weight ratio 9:1). The reaction product was isolated by precipitation.

2. Polystyrene block polyneopentyl glycol carbonate 0.4 ml of sec.-buthyl-lithium (1.4M solution in cyclohexane) was added to a solution of 15 g of styrene in 300 ml of toluene at $+40°$ C. under nitrogen and the mixture was allowed to react at this temperature for four hours.

The solution of polystyryl-lithium was cooled to $-10°$ C. and treated with ethylene oxide until the solution was decolorized. A solution of 15 g of neopentylglycol carbonate in 100 ml of toluene was added to the lithium alcoholate solution thus formed and the mixture was allowed to react at $-10°$ C. for four hours.

Decomposition of the reaction mixture was carried out with 10 ml of methanol/hydrochloric acid (weight ratio 9:1). The reaction product was isolated by precipitation.

3. Polystyrene block polyhexamethylene 1,6-glycol carbonate 0.4 ml of sec.-buthyl-lithium (1.4M solution in cyclohexane) was added to a solution of 15 g of styrene in 300 ml of tetrahydrofuran at $-70°$ C., under nitrogen, and the mixture was allowed to react at this temperature for four hours.

The solution of polystyryl-lithium was warmed to $-10°$ C. and treated with ethylene oxide until the solution was decolorized. A solution of 15 g of bishexamethylene dicarbonate was added to the lithium alcoholate solution thus formed and the mixture was heated at +70° C. for 90 minutes and allowed to react at −10° C. for four hours.

Decomposition of the reaction mixture was carried out with 10 ml of methanol/hydrochloric acid (weight ratio 9:1). The reaction product was isolated by precipitation.

4. Polystyrene block polytrimethylpropane monoallyl ether-carbonate 0.4 ml of sec.-buthyl-lithium (1.4M solution in cyclohexane) was added to a solution of 15 g of styrene in 300 ml of toluene at +40° C. under nitrogen and the mixture was allowed to react at this temperature for four hours.

The solution of polystyryl-lithium was cooled to −10° C. and treated with ethylene oxide until the solution was decolorized. 15 g of trimethylolpropane monoallyl ether-carbonate were added to the lithium alcoholate solution thus formed as the mixture was allowed to react at −10° C. for four hours.

Decomposition of the reaction mixture was carried out with 10 ml of methanol/hydrochloric acid (weight ratio 9:1). The reaction product was isolated by precipitation.

5. Polystyrene block polyneopentylglycol carbonate block poly-ϵ-caprolactone 0.4 ml of sec.-buthyl-lithium (1.4M solution in cyclohexane) was added to a solution of 10 g of styrene in 200 ml of toluene at 40° C. under nitrogen and the mixture was allowed to react at this temperature for four hours.

The solution of polystyryl-lithium was cooled to −10° C. and treated with ethylene oxide until the solution was decolorized. 10 g of neopentylglycol carbonate in 100 ml of ϵ-caprolactone were added to the lithium alcoholate solution thus formed and the mixture was allowed to react at −10° C. for four hours.

The reaction mixture was decomposed with 10 ml of methanol/hydrochloric acid (weight ratio 9:1). The reaction product was isolated by precipitation.

6. Polystyrene block poly-ϵ-caprolactone block polyneopentylglycol carbonate 0.4 ml of sec.-buthyl-lithium (1.4M solution in cyclohexane) was added to a solution of 10 g of styrene in 200 ml of toluene at +40° C. under nitrogen and the mixture was allowed to react at this temperature for four hours.

The solution of polystyryl-lithium was cooled to −10° C. and treated with ethylene oxide until the solution was decolorized. 10 g of ϵ-caprolactone and, after a reaction time of two hours, a solution of 10 g of neopentylglycol carbonate in 100 ml of toluene was added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

7. Polystyrene block polyneopentylglycol carbonate block polystyrene 0.4 ml of sec.-buthyl-lithium (1.4M solution in cyclohexane) was added to a solution of 15 g of styrene in 300 ml of toluene at +40° C. under nitrogen and the mixture was allowed to react at this temperature for four hours.

The solution of polystyryl-lithium was cooled to −10° C. and treated with ethylene oxide until the solution was decolorized. A solution of 15 g of neopentylglycol carbonate in 100 ml of toluene was added to the lithium alcoholate solution thus formed and the mixture was allowed to react at −10° C. for four hours.

The reaction mixture is reacted with $2.8 \times 10^{-4}$ mol of phosgene for coupling of two live polymer radicals, after which the reaction product is isolated by precipitation.

8. Polystyrene block poly-ϵ-caprolactone block polystyrene 0.4 ml of sec.-buthyl-lithium (1.4M solution in cyclohexane) was added to a solution of 15 g of styrene in 450 ml of toluene at +40° C. under nitrogen and the mixture was allowed to react at this temperature for four hours.

The solution of polystyryl-lithium was cooled to −10° C. and treated with ethylene oxide until the solution was decolorized. 30 g of ϵ-caprolactone were added to the lithium alcoholate solution thus formed and the mixture was allowed to react at −10° C. for four hours.

The reaction mixture is treated with $2.8 \times 10^{-4}$ mol of phosgene and the reaction product is isolated by precipitation.

9. Polystyrene block polyhexamethyleneglycol carbonate block polystyrene 0.4 ml of sec.-buthyl-lithium (1.4M solution in cyclohexane) was added to a solution of 15 g of styrene in 300 ml of tetrahydrofuran at −70° C. under nitrogen and the mixture was allowed to react at this temperature for four hours.

The solution of polystyryl-lithium was warmed to −10° C. and treated with ethylene oxide until the solution was decolorized. A solution of 15 g of bishexamethylene dicarbonate was added to the lithium alcoholate solution thus formed and the mixture was heated at +70° C. for 90 minutes and allowed to react at −10° C. for four hours.

The reaction mixture is treated with $2.8 - 10^{-4}$ mol of phosgene and the reaction product is isolated by precipitation.

10. Polystyrene block (random polyneopentylglycol carbonate trimethylolpropane monoallyl ether-carbonate)

0 4 ml of sec.-buthyl-lithium (1.4M solution in cyclohexane) was added to a solution of 15 g of styrene in 300 ml of toluene at +40° C. under nitrogen and the mixture was allowed to react at this temperature for four hours.

The solution of polystyryl-lithium was cooled to −10° C. and treated with ethylene oxide until the solution was decolorized. A solution of 13.6 g of neopentylglycol carbonate and 1.4 g of trimethylolpropane monoallyl ether-carbonate in 100 ml of toluene was added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

11. Polystyrene block (random poly-ϵ-caprolactone trimethylolpropane monoallyl ether-carbonate)

0.4 ml of sec.-buthyl-lithium (1.4M solution in cyclohexane) was added to a solution of 15 g of styrene in 400 ml of toluene at +40° C. under nitrogen and the mixture was allowed to react at this temperature for four hours.

The solution of polystyryl-lithium was cooled to −10° C. and treated with ethylene oxide until the solution was decolorized. A mixture of 13.6 g of ϵ-caprolactone and 1.4 g of trimethylolpropane monoallyl ether-carbonate was added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

12. Polystyrene block random poly-ε-caprolactone trimethylolpropane monoallyl ether-carbonate block polystyrene 0.4 ml of sec.-buthyl-lithium (1.4M solution in cyclohexane) was added to a solution of 15 g of styrene in 400 ml of toluene at +40° C. under nitrogen and the mixture was allowed to react at this temperature for four hours.

The solution of polystyryl-lithium was cooled to −10° C. and treated with ethylene oxide until the solution was decolorized. A mixture of 13.6 g of caprolactone and 1.4 g of trimethylpropane monoallyl ether-carbonate was added to the lithium alcoholate solution thus formed and the mixture was allowed to react at −10° C. for four hours.

The reaction mixture is treated with $2.8 \times 10^{-4}$ mol of phosgene and the reaction product is isolated by precipitation.

13. Polystyrene block (random polyneopentylglycol carbonate trimethylolpropane monoallyl ether-carbonate) block polystyrene 0.4 ml of sec.-buthyl-lithium (1.4M solution in cyclohexane) was added to a solution of 15 g of styrene in 300 ml of toluene at +40° C. under nitrogen and the mixture was allowed to react at this temperature for four hours.

The solution of polystyryl-lithium was cooled to −10° C. and treated with ethylene oxide until the solution was decolorized. A solution of 13.6 g of neopenthylglycol carbonate and 1.4 g of triethylpropane monoallyl ether-carbonate in 100 ml of toluene was added to the lithium alcoholate solution thus formed and the mixture was allowed to react at −10° C. for four hours.

The reaction mixture is treated with $2.8 \times 10^{-4}$ mol of phosgene and the reaction product is isolated by precipitation.

14. Polybutadiene block polyneopentylglycol carbonate 0.4 ml of sec.-buthyl-lithium (1.4M solution in cyclohexane) was added to 300 ml of toluene at +50° C. under nitrogen, 15 g of butadiene were then metered in and the mixture was allowed to react at this temperature for two hours.

The solution of butadienyl-lithium was brought to −10° C. and treated with ethylene oxide until the solution was decolorized. A solution of 15 g of neopentylglycol carbonate in 100 ml of toluene was added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

15. Polybutadiene block poly-ε-caprolactone 0.4 ml of sec.-buthyl-lithium (1.4M solution in cyclohexane) was added to 300 ml of toluene at +50° C. under nitrogen, 15 g of butadiene were then metered in and the mixture was allowed to react at this temperature for two hours.

The solution of butadienyl-lithium was brought to −10° C. and treated with ethylene oxide until the solution was decolorized. 15 g of ε-caprolactone were added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

16. Polybutadiene block polyneopentylglycol carbonate block polybutadiene 0.4 ml of sec.-butyl-lithium (1.4M solution in cyclohexane) was added to 300 ml of toluene at +50° C. under nitrogen, 15 g of butadiene were then metered in and the mixture was allowed to react at this temperature for two hours.

The solution of butadienyl-lithium was brought to −10° C. and treated with ethylene oxide until the solution was decolorized. A solution of 15 g of neopentylglycol carbonate in 100 ml of toluene were added to the lithium alcoholate solution thus formed and the mixture was allowed to react at −10° C. for four hours.

The reaction mixture is treated with $2.8 \times 10^{-4}$ mol of phosgene and the recation product is isolated by precipitation.

17. Polybutadiene block poly-ε-caprolactone block polybutadiene 0.4 ml of sec.-buthyl-lithium (1.4M solution in cyclohexane) was added to 300 ml of toluene at +50° C. under nitrogen, 15 g of butadiene were then metered in and the mixture was allowed to react at this temperature for two hours. The solution of butadienyl-lithium was brought to −10° C. and treated with ethylene oxide until the solution was decolorized. 15 g of ε-caprolactone were added to the lithium alcoholate solution thus formed and the mixture was allowed to react at −10° C. for four hours.

The reaction mixture is treated with $2.8 \times 10^{-4}$ mol of phosgene and the reaction product is isolated by precipitation.

18. Polystyrene block polybutadiene block polyneopentylglycol carbonate 0.4 ml of sec.-buthyl-lithium (1.4M solution in cyclohexane) was added to a solution of 10 g of styrene in 200 ml of toluene at +40° C. under nitrogen and the mixture was allowed to react at this temperature for four hours.

10 g of butadiene were added to the solution of polystyryl-lithium at 50° C. and, after a reaction time of two hours, the solution was treated with ethylene oxide at −10° C. until the solution was decolorized. A solution of 10 g of neopentylglycol carbonate in 100 ml of toluene was added to the lithium alcoholate solution thus formed and the mixture was allowed to react at −10° C. for four hours.

Decomposition of the reaction mixture was carried out with 10 ml of methanol/hydrochloric acid (weight ratio 9:1). The reaction product was isolated by precipitation.

We claim:

1. A process for the production of a thermoplastic block polymer of the formula (I)

A—B—A; B—A—B or (A—B)$_x$     (I)

in which x is 1 to 40,

A denotes a radical of a homopolymer of styrene, vinylnaphthalene, butadiene or isoprene and B denotes a radical of a homopolymer of a cyclic aliphatic carbonate of the formulae

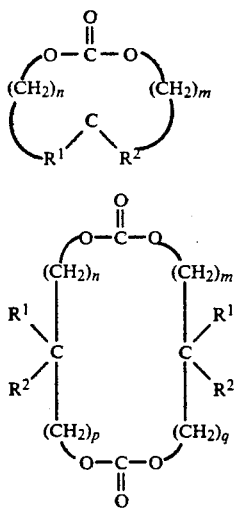

in which
m, n, and q independently of one another are 0, 1, 2, 3, 4, 5, or 6 with the proviso that n+m in formula (II) is at least 1 and n+p as well as m+q in formula III are at least 1 and $R^1$ and $R^2$ each independently denote hydrogen or $C_{1-6}$-alkyl, $C_{3-6}$ alkenyl or $C_{1-6}$-alk(en)yloxy-$C_{1-6}$-alkyl group, and the average molecular weight, $M_w$, of blocks A and B are greater than 800, said process comprising 1) homopolymerizing a monomer which is used to form block A in an aromatic solvent or ether by means of an alkyl-alkali metal compounds or aryl-alkali metal compound to form a live polymeric anion, 2) reacting the live anion with an epoxide or an aldehyde, at least 1 mol of epoxide or 1 mol of aldehyde being employed per mol of anion, and 3) block copolymerizing the product of step 2) in a monomer of the formula (II) or (III) in the temperature range from $-50°$ C. to $+10°$ C.

2. A process according to claim 1, in which, after step 3 of the process, neutralization is carried out or the anionic block polymer formed is reacted with the compound selected from alkyl halides, carboxylic acid chlorides, carboxylic acid anhydrides and carboxylic acid esters.

3. A process according to claim 2, in which the block copolymerization is carried out at a temperature from $-20°$ C. to $0°$ C.

4. A process according to claim 1, in which x is 6 to 20.

5. A process according to claim 1, in which A denotes a radical of a homopolymer of styrene or butadiene.

6. A process according to claim 1, in which $R^1$ and $R^2$ each independently denote hydrogen or a methyl or ethyl group.

7. A process according to claim 1, in which the average molecular weights $M_w$ or blocks A and B are greater than 1,000.

8. A process according to claim 7, in which the average molecular weight $M_w$ of blocks A and B are greater than 10,000.

9. A process according to claim 1, containing either 5 to 20% by weight of block A and 95 to 80% by weight of block B, or 95 to 80% by weight of block A and 5 to 20% by weight of block B.

* * * * *